United States Patent  [15] 3,639,898
Booth  [45] Feb. 1, 1972

[54] DIFFERENTIAL PRESSURE CONTROL SYSTEM AND SWITCH MEANS THEREFOR

[72] Inventor: Robert G. Booth, 6661 Banning Drive, Oakland, Calif. 94611

[22] Filed: Apr. 2, 1969

[21] Appl. No.: 812,668

[52] U.S. Cl. .................................340/71, 200/83, 340/52
[51] Int. Cl. .............................................B60q 1/44
[58] Field of Search ................340/52, 53, 71, 72, 94, 240, 340/241; 200/83.4, 83, 61.25, 83.2, 82 D

[56] References Cited

UNITED STATES PATENTS 2,250,133  7/1941  Pearce et al. ...........................340/66
2,182,816  12/1939  Moffett ...............................200/82 D
1,859,598  5/1932  North ..................................340/71
2,562,286  7/1951  Wall ...................................200/83 A
3,011,595  12/1961  Heiss et al. ..........................340/52 C Primary Examiner—John W. Caldwell
Assistant Examiner—Glen R. Swann, III
Attorney—Edward Brosler

[57] ABSTRACT

A signal system adapted to anticipate application of brakes in an automotive vehicle, utilizes a vacuum operable switch assembly coupled into the intake manifold and designed to respond to vacuum in said intake manifold above a threshold value representative of an emergency condition, as brought on by rapid removal of one's foot from the gas feed pedal.

6 Claims, 2 Drawing Figures

PATENTED FEB 1 1972

3,639,898

INVENTOR
ROBERT G. BOOTH

BY Edward Brosler
ATTORNEY

DIFFERENTIAL PRESSURE CONTROL SYSTEM AND SWITCH MEANS THEREFOR

BACKGROUND OF INVENTION

My invention relates to a signal system and switch assembly for use in such system. Though of general utility, the invention will be described as applied to a system for anticipating the application of brakes in an automotive vehicle.

Modern transportation involving the development of freeways and superhighways, and increased use of automotive vehicles, has resulted in a vast increase in the accident rate, largely attributable to failure or inability of drivers to maintain safe spacing between vehicles in accordance with the speed at which they are traveling.

An automobile traveling at 60 miles per hour on a highway, is moving at the rate of 88 feet per second. In present day braking systems, the signal lights are stimulated through closing of a switch by the footbrake pedal after the brake pedal has been depressed to actuate the brakes. The driver reaction time, as measured from the moment he becomes aware of an emergency calling for application of the brakes, to the moment of actual application of the brakes, may vary from three-tenths to eight-tenths of a second. During this brief interval, the driver behind, receives no indication of the intended application of brakes by the driver ahead. In the mean time, the car ahead will have decelerated due to the sudden removal of the driver's foot from the gas feed pedal, preparatory to the application of the brakes.

Thus, while the car ahead is decelerating, the car behind, during this brief interval, will continue traveling at its prevailing speed, which at 60 miles an hour, would mean 26.4 to 70.4 feet. With less than such distance prevailing between the cars at that time, a rear end collision will inevitably result, and probably followed by a chain reaction involving following cars. And if one considers the reaction time of the driver behind, the danger of rear end collisions multiply. Were it possible to eliminate such reaction time, in notifying the driver behind of one's intention to apply the brakes, the driver behind would have that much additional distance within which to bring his car to a stop, and thereby minimize the risk of such collisions occuring.

Among the objects of my invention are;

1. To provide a novel and improved brake signal system adapted to anticipate the application of brakes in an automotive vehicle, whereby to essentially eliminate the reaction time element;

2. To provide a novel and improved switch assembly of general utility, adapted for use in a brake signal system, to anticipate the application of the brakes in an automotive vehicle; and 3. To provide a novel and improved vacuum operated switch assembly of simple construction, and one which may be readily installed for use in an appropriate system.

Additional objects of my invention will be brought out in the following description of a preferred embodiment of the same, taken in conjunction with the accompanying drawings wherein;

DESCRIPTION OF THE PREFERRED EMBODIMENT

Figure 1:
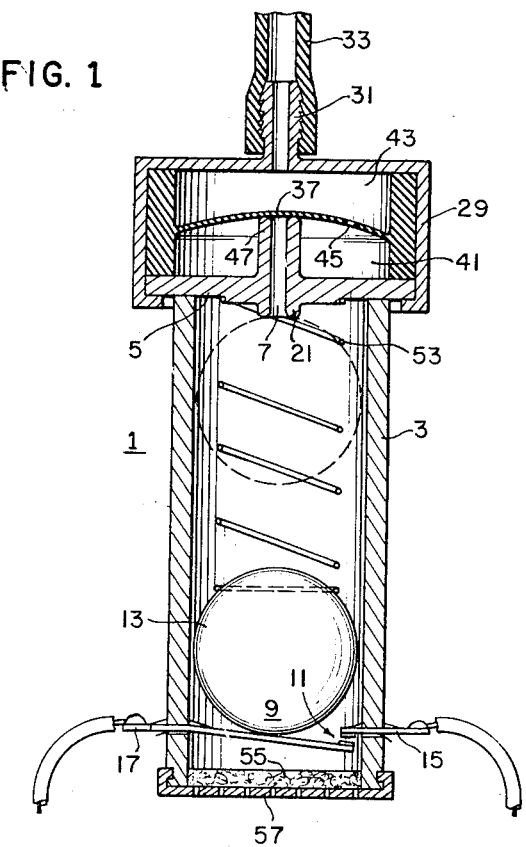
FIG. 1 is a view in section, through a switch assembly of the present invention.
Figure 2:
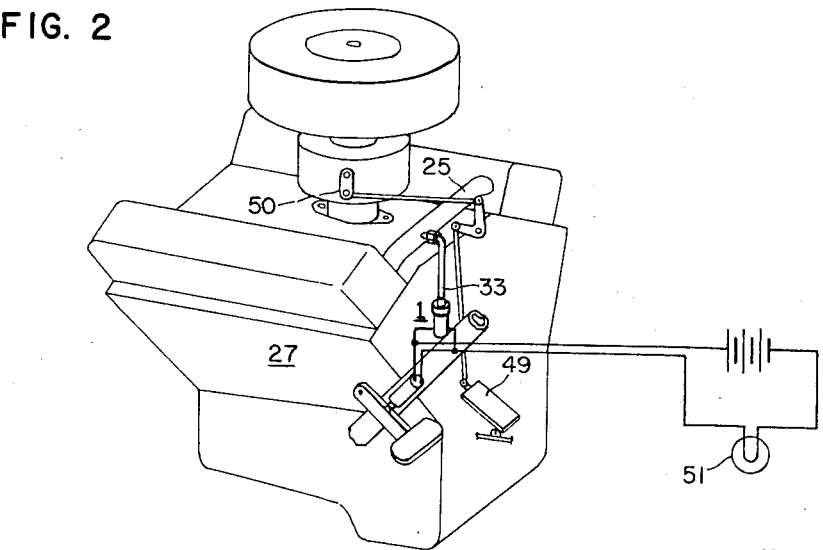
FIG. 2 is a view depicting its application to a signal system for anticipating application of brakes in an automotive vehicle.

Referring to the drawings for details of my invention in its preferred form, the switch assembly 1, which constitutes the essence of the present invention, involves a housing 3, preferably one having an interior cylindrical wall and open at one end, while at its other end the housing includes a wall 5 having a passageway therethrough.

Within the housing, in proximity to the open end thereof, are switch means 9 including a switch 11 and a movable weight 13 bearing thereon, to maintain the switch in a normally open condition.

As to specific structure, the switch involves a switch element 15 extending for a short distance into the housing through a wall thereof in which it is spring clipped, the switch element terminating in a switch contact. A second switch element 17 similarly clipped in the wall of the housing but at a point diametrically opposite the first element, extends transversely of the housing, and terminates in a contact facing the contact on the first element. The movable weight 13, preferably in the form of a ball, normally bears against the longer element of the switch, and is of sufficient weight to depress this element and thus maintain the switch in normally open condition. Movement of the ball away from such weight bearing engagement, will permit the switch to close and establish a circuit in a system in which the switch is to be connected.

Such movement of the ball away from the switch, may be brought on by the establishment in the upper region of the housing, of a vacuum by way of the passageway 7 in the end wall, the reduction of pressure in this portion of the switch housing, resulting in an in rush of air through the open end, to suddenly raise the ball against the end wall into blocking relationship with the passageway. A more effective blocking may be realized by encircling the proximate end of the passageway with a circular rib 21.

For developing such reduction in pressure, in response to a condition existing externally of the switch assembly, and to enable such switch assembly to respond to, for example, a variable vacuum condition as may exist in the intake manifold 25 of an internal combustion engine 27, an associated housing 29 is installed at the end of the switch housing, such associated housing being provided with a nipple 31 for effecting a flow connection 33 to such intake manifold.

Spanning the interior of the associated housing, between the passage 7 from the switch housing and the aforementioned nipple, is a diaphragm 37 of silicone rubber or other appropriate material, which divides the housing into an inner chamber 41 and an outer chamber 43. This diaphragm preferably has leak characteristics due either to inherent porosity or to the provision of a small leak opening 45 therein, whereby, in the absence of dominating outside influence, there will be a tendency for conditions on both sides of the diaphragm to equalize. This can more effectively be realized by normally blocking the passageway 7 from the switch housing into the lower chamber, and this can be accomplished by providing a teat 47 extending into the associated housing from the end wall 5, and through which the passageway extends, and then causing the diaphragm to engage the end of the teat and normally block the passageway.

As thus far described, the diaphragm will be exposed to the varying vacuum conditions which develop in the intake manifold of an internal combustion engine during operation thereof. When such internal combustion engine is installed in an automotive vehicle, such variable vacuum condition is the result of manipulation of the gas feed pedal 49 which operates a throttle valve 50 associated with the intake manifold and thus controls the supply of gas and air to the intake manifold for detonation in the cylinders of the engine.

During normal running of a car, the manipulations of the gas feed pedal are normally smooth and gradual, with corresponding variations in the vacuum condition prevailing in the intake manifold. However, upon sensing a danger calling for application of the brakes, the driver suddenly withdraws his foot from the gas feed pedal, thus closing off the main flow of gas and air to the intake manifold, leaving but a minimum feed of gas to support idling of an engine. A high degree of vacuum is suddenly developed, above the threshold value representing a maximum for normal driving conditions, such sudden high degree of vacuum being attributable to the fact that at the moment of fast release of the pedal, the engine is running at high speed and exhausting the intake manifold, following which it will decelerate quite rapidly.

With the switch connected in circuit to a signal light 51, which may be the prevailing brake light, such light, in the absence of other provisions, would respond to rapid increases in vacuum within the intake manifold, even for some values conceivably occurring occasionally during normal driving conditions, and for a brake system, this would not be too desirable.

Accordingly, to differentiate between vacuum conditions up to such threshold value, which conditions represent normal driving conditions, and vacuum conditions above such threshold value which represent emergency conditions calling for application of the brakes, the diaphragm is prestressed across the passageway nipple, to the extent that any vacuum condition developed in the outer chamber 43 up to the threshold value, can not result in a stretching of the diaphragm away from the nipple, whereas sharp increases in vacuum in the outer chamber above such threshold value, will suddenly stretch the diaphragm away from the nipple before equalization can occur, and expose the ball to the resulting creation of a vacuum condition in the inner chamber attributable to such sudden stretching of the diaphragm.

In response to the vacuum thus suddenly created in the inner chamber, the ball will jump to the end wall and close the passageway, the removal of its weight from the switch element 17, in turn, causing the switch to close and stimulate the signal light.

In the absence of the leak characteristic of the diaphragm, the ball would tend to remain in its passageway blocking position for a period of time longer than would be desired in a brake signal system, but due to the leak characteristic of the diaphragm, conditions within the inner and outer chambers can equalize. In the course of such equalization, the diaphragm will restore itself to its prestressed condition across the nipple to block the passageway, and during such restoration, the ball will be free to "float" back and open the switch, the time for the entire cycle being timed to take place in about 2 seconds, for a brake signal system application.

With the switch assembly mounted vertically, the ball weight will function satisfactorily due to gravity alone, but, if the switch assembly is mounted horizontally, a light spring 53 may be installed between the end wall 5 and the ball weight 13, to assist in restoring the ball weight to its bearing engagement with the switch.

To minimize entrance of dust and dirt into the switch housing through the open end thereof, a filter pad 55 may be installed in the open end of the housing and retained therein by a perforated cap 57, which is preferably removably secured thereto, in order to permit removal of the filter pad for cleaning or replacement.

From the foregoing description of my invention in its preferred form, it will be apparent that the same fulfills the objects of my invention, and while I have illustrated and described the same in its preferred form, it will be apparent that the same is subject to alteration and modification without departing from the underlying principles involved.

The invention furthermore is not limited in its application to a brake system of an automotive vehicle, but the switch assembly may be so made as to respond to pressure, and may be utilized in an altitude compensation valve system, in a depth pressure regulator, in a sequential flasher . . . etc. In the latter case, the ball may be replaced by a piston having spaced peripheral grooves connecting radially to a central passage exposed to the upper end of the housing. A bore in the wall communicates with a vacuum actuated switch. Movement of the piston past the bore, intermittently exposes the switch to vacuum developed in the upper end of the housing as previously described, whereby a sequential signal will result.

I claim:

1. A vacuum operable switch assembly comprising a housing, switch means in said housing responsive to creation of a vacuum in said housing for changing the electrical condition of said switch means, said switch means including a switch element extending into said housing a short distance and terminating in a contact, another switch element extending transversely of said housing and terminating in a contact facing the contact of said first element to form a switch and establish an electrical condition of the same, and a movable weight bearing on said second switch element to change the condition of said switch to a normally maintained condition, whereby movement of said weight away from said engaged switch element will change the condition of said switch from its normally maintained condition, means for introducing air into said housing on the switch side of said weight, and means for use in establishing a vacuum condition in said housing to the other side of said weight, whereby to cause said weight to move away from its bearing engagement with said switch element.

2. A stop warning signal system adapted for an automotive vehicle powered by an internal combustion engine having an intake manifold and a gas feed pedal, comprising a vacuum operated switch assembly including a housing having an end wall with a passageway therethrough, normally open switch means in said housing, an electrically (stimulated) actuated signal means in an electrical circuit including said normally open switch means, means for coupling said vacuum operated switch assembly to said intake manifold by way of said passageway for vacuum operating said switch assembly, and means for rendering said normally open switch means nonresponsive to vacuum conditions in said intake manifold below a threshold value, which conditions represent nonemergency manipulations of said gas feed pedal, said last means comprising an associate housing enclosing said end wall of said first housing and having an exposed flow connection for connecting said vacuum operable switch assembly to said intake manifold, said end wall including a teat thereon through which said passageway extends, a leak diaphragm spanning said associate housing between said exposed flow connection and said passageway, in prestressed engagement with said teat, to create an outer and inner chamber and at the same time block said passageway, said prestressing of said diaphragm being such as to render said diaphragm nonresponsive to vacuum conditions in said intake manifold below said threshold value, but responsive to values above said threshold value to stretch said diaphragm away from said teat and expose said switch to the resulting vacuum condition created in said inner chamber.

3. A stop warning signal system in accordance with claim 2, characterized by said diaphragm being of silicone rubber.

4. A vacuum operable switch assembly adapted for use in a stop warning signal system, comprising a housing, switch means in said housing responsive to creation of a vacuum in said housing for changing the electrical condition of said switch means, said switch means including a switch element extending into said housing a short distance and terminating in a contact, another switch element extending transversely of said housing and terminating in a contact facing the contact of said first element and adapted to engage the same, and a movable weight normally bearing on said second element to normally maintain the contact of said second element in spaced relationship to that of said first element to create a normally open switch, whereby movement of said weight away from its bearing relationship against said second element, will cause said switch to close, and means adapted to be coupled to a source of vacuum for controlling vacuum conditions in said housing, said means being responsive to such a vacuum source above a threshold value of vacuum, to create a vacuum condition in said housing and cause change in the electrical condition of said switch means, but being nonresponsive to such source of vacuum at values below said threshold value.

5. A vacuum operable switch assembly in accordance with claim 4, characterized by said housing having a cylindrical interior wall, and said movable weight being a ball of a diameter approaching that of said cylindrical interior wall.

6. A vacuum operable switch assembly adapted for use in a stop warning signal system comprising a housing, switch means in said housing responsive to creation of a vacuum in said housing for changing the electrical condition of said switch means, and means adapted to be coupled to a source of vacuum for controlling vacuum conditions in said housing, said means being responsive to such a vacuum source above a threshold value of vacuum, to create a vacuum condition in said housing and cause change in the electrical condition of said switch means, but being nonresponsive to such source of said vacuum at values below said threshold value and including a passageway through a wall of said housing and a teat on said wall through which said passageway extends, an associate housing enclosing said teat and having an exposed flow connection for connecting said vacuum operable switch to a source of vacuum, a leak diaphragm spanning said associated housing between said exposed flow connection and said passageway, in prestressed engagement with said teat, to create an outer and inner chamber and at the same time block said passageway, said prestressing of said diaphragm being such as to render said diaphragm nonresponsive to vacuum conditions below a threshold value, but responsive to values above said threshold value to stretch said diaphragm away from said teat and expose said switch to the resulting vacuum condition created in said inner chamber.

* * * * *